Figure 1:
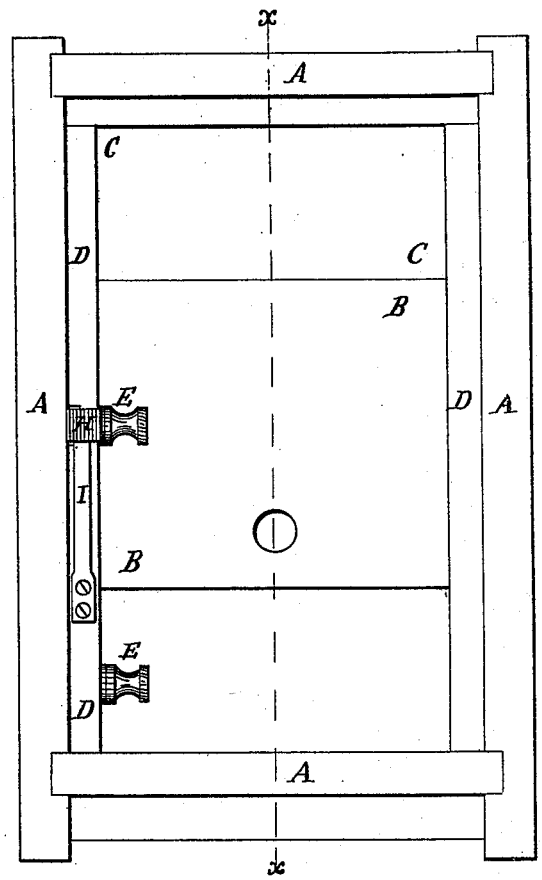
Figure 2:
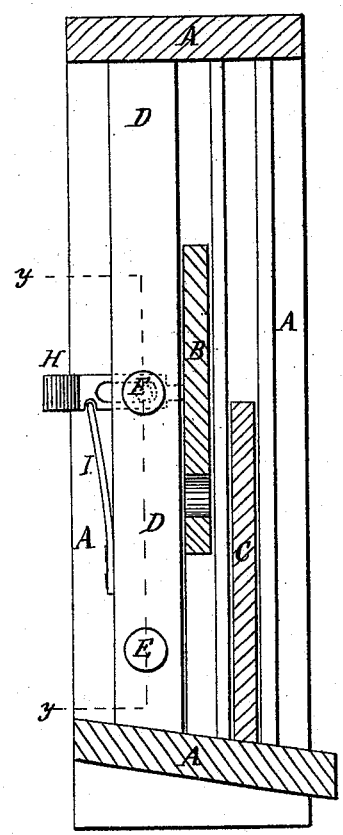
Figure 3:
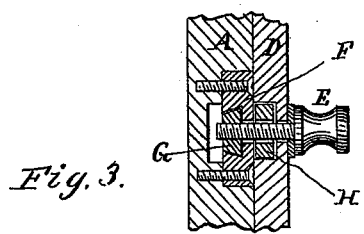
Figure 4:
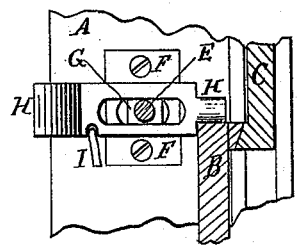

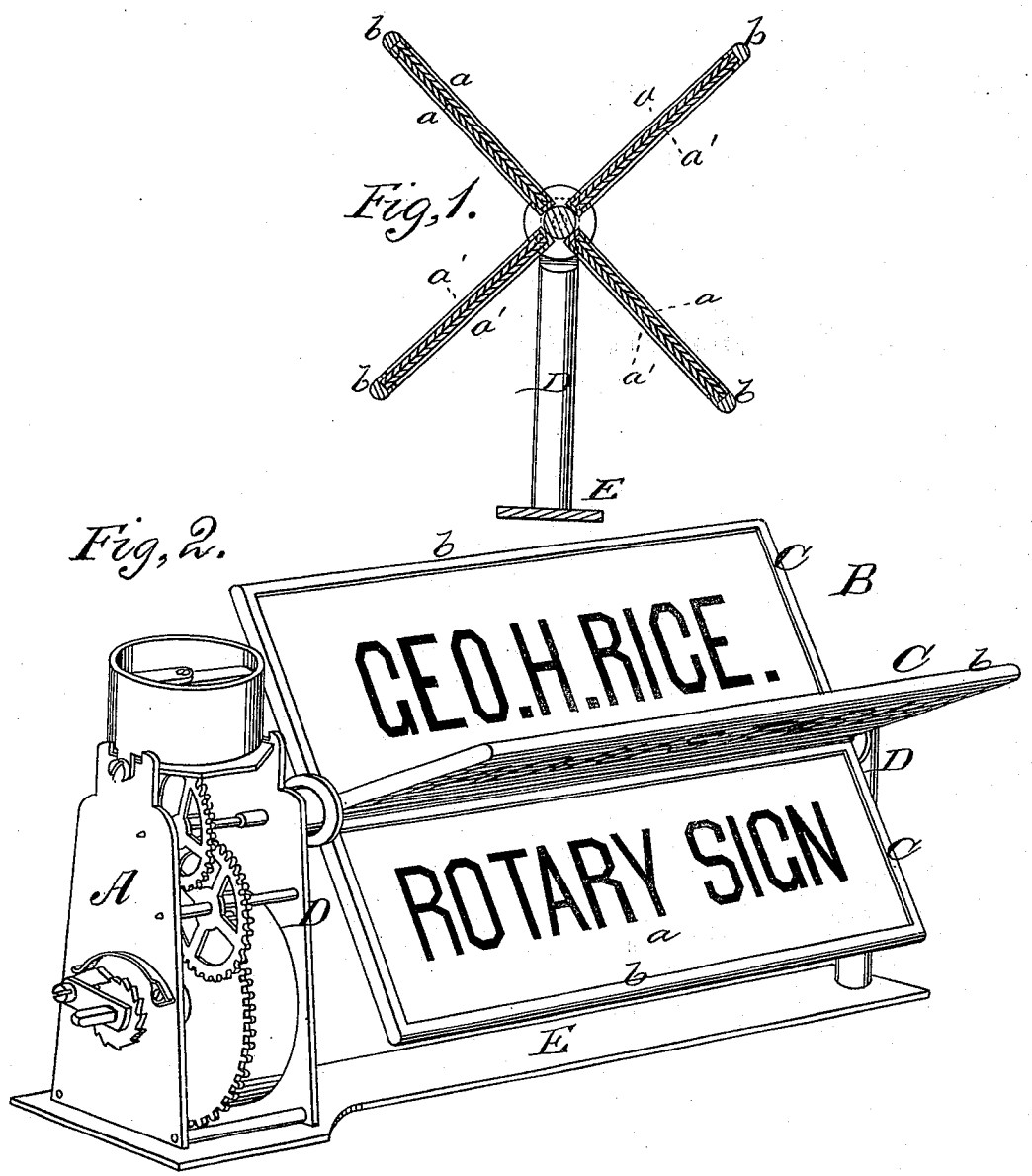

W. D. ROPER & J. W. MITCHELL.
Sash-Fastener.

No. 210,053.                    Patented Nov. 19, 1878.

WITNESSES:
Henry N. Miller
C. Sedgwick

INVENTOR:
W. D. Roper
J. W. Mitchell
BY Munn & Co
ATTORNEYS.